(12) United States Patent
Halverson et al.

(10) Patent No.: US 8,403,280 B2
(45) Date of Patent: Mar. 26, 2013

(54) MICROPHONE MOUNTING APPARATUS

(75) Inventors: Jon Caleb Halverson, Des Plaines, IL (US); Walter Timothy Harwood, Streamwood, IL (US); Paul Mark Jacobs, Evanston, IL (US); Martin K. Reiling, Grayslake, IL (US); John P. Devlin, Tewksbury, MA (US); Gabor Zanoni, Cambridge, MA (US)

(73) Assignee: Shure Acquisition Holdings, Inc., Niles, IL (US)

( * ) Notice: Subject to any disclaimer, the term of this patent is extended or adjusted under 35 U.S.C. 154(b) by 26 days.

(21) Appl. No.: 12/868,520

(22) Filed: Aug. 25, 2010

(65) Prior Publication Data
US 2012/0049025 A1    Mar. 1, 2012

(51) Int. Cl.
*G09F 7/18*    (2006.01)
(52) U.S. Cl. ........... 248/229.22; 248/229.24; 248/228.5; 248/230.5
(58) Field of Classification Search .............. 248/274.1, 248/316.5, 229.1, 22.14, 316.6; 269/53, 269/90, 86, 89, 101, 159; D14/229; 24/486, 24/514, 525, 569; 292/277, 289, 339; 81/165–174, 81/411 R, 422.1–422.3; 16/DIG. 25
See application file for complete search history.

(56) References Cited

U.S. PATENT DOCUMENTS

| | | | |
|---|---|---|---|
| 4,466,596 A | 8/1984 | Cohen | |
| 6,757,400 B1 | 6/2004 | Cheng | |
| 6,893,012 B2 * | 5/2005 | Wong | 269/249 |
| 7,441,981 B2 * | 10/2008 | Crain et al. | 403/321 |
| 2003/0080267 A1 * | 5/2003 | Eslick | 248/229.1 |
| 2007/0144329 A1 | 6/2007 | Hollander | |
| 2010/0038509 A1 * | 2/2010 | Russell | 248/288.11 |

OTHER PUBLICATIONS

International Search Report and Written Opinion dated Nov. 21, 2011 for PCT/US2001/048089, 10 pages.

* cited by examiner

*Primary Examiner* — Jonathan Liu
*Assistant Examiner* — Erin W Smith
(74) *Attorney, Agent, or Firm* — Banner & Witcoff, Ltd.

(57) ABSTRACT

A microphone is mounted to apparatus in order to receive sound from a sound source. The apparatus has a microphone clamp to secure different microphones to a variety of musical instruments and other sound sources and may be used to directly mount a microphone to a variety of clamping surfaces. The mounting apparatus incorporates a dual jaw design to allow for easy, fast, and secure mounting to the clamping surface. The apparatus supports a quick release mechanism for easy and fast engagement and disengagement of the dual jaws, consequently reducing time needed to securely clamp and remove the mounting apparatus with the clamping surface. The release mechanism may include a dowel release having a hole through which the jaw stud is situated. The hole has two curved surfaces so that one of jaws may be moved without turning the jaw stud when the dowel release is depressed.

16 Claims, 19 Drawing Sheets

MICROPHONE MOUNTING APPARATUS

TECHNICAL FIELD

The disclosure herein relates to the field of sound production, more specifically to the field of sound production using one or more microphones. Aspects of the disclosure relate to a mounting apparatus for a placement of a microphone in the proximity of a musical instrument or other audio source.

BACKGROUND

Configuring microphones for a drum set (often referred as "micing the drum set") is often a complex task of an audio or sound engineer in a recording studio or at a venue. In addition to a drum set, an audio engineer often has to position microphones adjacent to a variety of other sound sources when recording or providing sound reinforcement for a musical performance. Thus, the engineer may have a need to "mic" a variety of different instruments and sound sources, including vocals, amplifiers, acoustic instruments, brass and woodwind instruments, etc. In doing so, the audio engineer often must arrange a variety of microphones adjacent or proximate to such sound sources. This may involve mounting or affixing microphones to a variety of surfaces and hardware, including microphone stands, drum hardware, amplifier cabinets, music stands, etc., or to other clamping surfaces. Moreover, the audio engineer may be under time constraints in which to mount and/or adjust such microphones so as to properly position them for optimum sound reinforcement. Thus, a need exists for a versatile, multi-purpose microphone mount which is quick and easy to use and adjust.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

According to an aspect of the disclosure, a microphone may be mounted to mounting apparatus in order to receive sound from a sound source, e.g., a musical instrument. The mounting apparatus may securely mount different microphones to a variety of musical instruments and other sound sources. For example, the mounting apparatus may be used for drum and percussion applications. The mounting apparatus may be used to directly mount a microphone to drum rims, hand percussion, drum and percussion hardware, and microphone stands. While the mounting apparatus may be used with drums and percussion instruments, the mounting apparatus may also be applicable to amplifier cabinets, piano frames, and other mounting surfaces where microphones may be employed.

According to another aspect of the disclosure, the mounting apparatus incorporates a dual jaw design to allow for easy, fast, and secure mounting to a variety of clamping surfaces with a variety of geometries, including drum rims, hand percussion tension rods, percussion hardware, and microphone stands.

According to another aspect of the disclosure, the mounting apparatus supports a quick release adjustment for easy and fast engagement and disengagement of the dual jaws, consequently reducing time needed to securely clamp and remove the mounting apparatus with a clamping surface.

According to another aspect of the disclosure, a microphone clamp may accept a variety of microphone mounting accessories, thus providing compatibility with numerous types of microphones.

According to another aspect of the disclosure, a mounting apparatus includes a pair of jaws for attaching the mounting apparatus to a clamping surface and a jaw stud for adjusting the pair of jaws. The mounting apparatus may have a release mechanism that is coupled to the jaw stud, in which the release mechanism releases one of jaws when the release mechanism is depressed allowing the jaw to freely slide along the jaw stud to open or close the pair of jaws on the clamping surface. While the release mechanism is not depressed, the release mechanism engages the threaded portion of the jaw stud, thereby allowing the first pair of jaws to tighten on the clamping surface when the jaw stud is turned along the threaded portion in a first direction. The mounting apparatus includes a microphone clamp to hold a microphone mounting accessory or microphone.

With another aspect of the disclosure, the mounting apparatus also includes a second pair of jaws for attaching the mounting apparatus to a clamping surface. The second pair may be oriented at a fixed angle (e.g., 90 degrees) with respect to the other pair of jaws.

With another aspect of the disclosure, the release mechanism includes a dowel release having a hole through which the jaw stud is situated. The hole has two curved surfaces, where the second curved surface is threaded to engage along a threaded portion of the jaw stud and the first curved surface is smooth so as to permit the dowel release to move along the jaw stud. When the dowel release is depressed the jaw stud is located proximate the first curved surface, and when the dowel release is not depressed the threaded portion of the jaw stud engages the second curved surface. When the jaw stud is positioned within the first curved surface one of the jaws may be moved without turning the jaw stud.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION OF THE INVENTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

According to an aspect of the disclosure, a microphone may be mounted to a mounting apparatus in order to receive sound from a sound source, e.g., a musical instrument. The mounting apparatus may securely mount different microphones to a variety of musical instruments and other sound sources. For example, the mounting apparatus may be used for drum and percussion applications. The mounting apparatus may be used to directly mount a microphone to drum rims, hand percussion, drum and/or percussion hardware, and microphone stands. While the mounting apparatus may be used with drums and percussion instruments, the mounting apparatus may be applicable to amplifier cabinets, piano frames, and other mounting surfaces where microphones may be employed.

According to another aspect of the disclosure, the mounting apparatus incorporates a dual jaw design to allow for easy, fast, and secure mounting to a variety of clamping surfaces with a variety of geometries, including drum rims, hand percussion tension rods, percussion hardware, and microphone stands.

According to another aspect of the disclosure, the mounting apparatus supports a quick release adjustment for easy and fast engagement and disengagement of the dual jaws, consequently reducing time needed to securely clamp and remove the mounting apparatus with a clamping surface.

According to another aspect of the disclosure, a microphone clamp may accept a variety of microphone mounting accessories, thus providing compatibility with numerous types of microphones.

Figure 1:
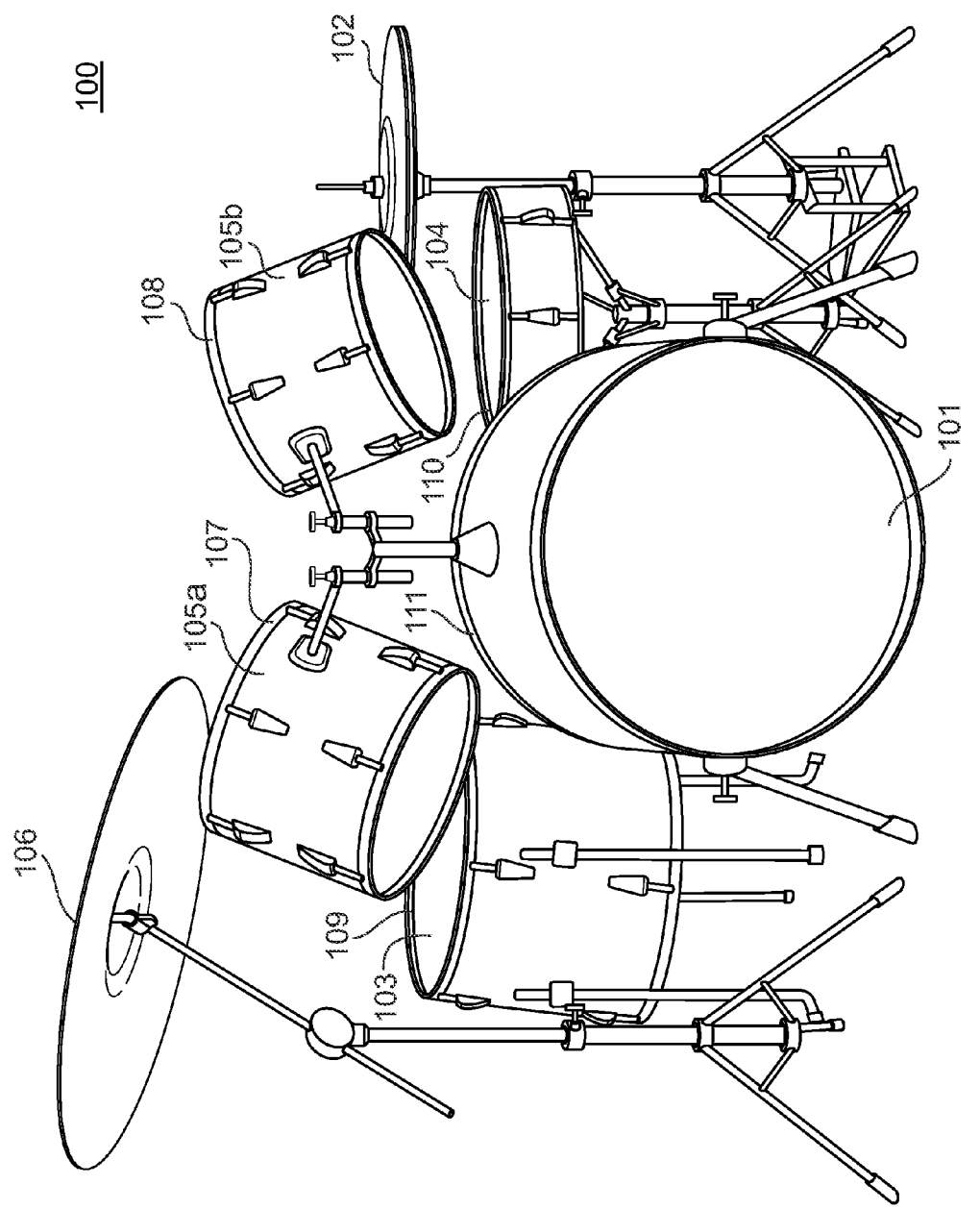
FIG. 1 shows a drum set for which microphones may be configured by a microphone mounting apparatus according to aspects of the disclosure.

FIG. 1 shows drum set 100 that may be configured with microphone mounting apparatus 200 according to aspects of the disclosure. Drum set 100 (which may be referred to as a drum kit or trap set) comprises a collection of drums, cymbals and often other percussion instruments, such as cowbells, wood blocks, triangles, chimes, or tambourines, arranged for convenient playing by a single person (drummer).

The individual instruments of a drum set are hit by a variety of implements held in the hand of the drummer, including sticks, brushes, and mallets. Two notable exceptions include the bass drum 101, played by a foot-operated pedal, and the hi-hat cymbals 102, which may be struck together using a foot pedal in addition to being played with sticks or brushes. Although other instruments may be played using a pedal, the feet are usually occupied by bass drum 101 and hi hat cymbals 102, and as a result the drummer often plays in a seated position. Drum set 100 comprises bass drum 101, floor tom 103, snare drum 104, tom-toms 105a,105b, and a variety of cymbals including hi-hat cymbals 102, ride cymbal 106 and a crash cymbal (not explicitly shown) but may include additional percussion instruments. Drums such as floor tom 103, tom-toms 105a, 105b, snare drum 104, and bass drum 101 have one or more drum rings or rims which hold a drum head onto the body of the drum. Drum rims 107-111 often are metal bands having a circular shape and a generally elongated cross-section, and are usually located at the ends of the drums, near the top end of the drum where the drum head is located. In some embodiments, drum rims 107-111 have a generally rectangular cross-section. Drum rims 107-111 may be adjusted by various mechanical means to adjust the tone, tuning, and response of the drum head.

Various music genres often incorporate the stylistically appropriate use of the drum kit's set-up. For example, in most forms of rock music, bass drum 104, hi-hat cymbals 102, and snare drum 104 are the primary instruments used to create a drum beat, whereas in jazz, ride cymbals 106 and snare drum 104 tend to be more prevalent.

Figure 2A:
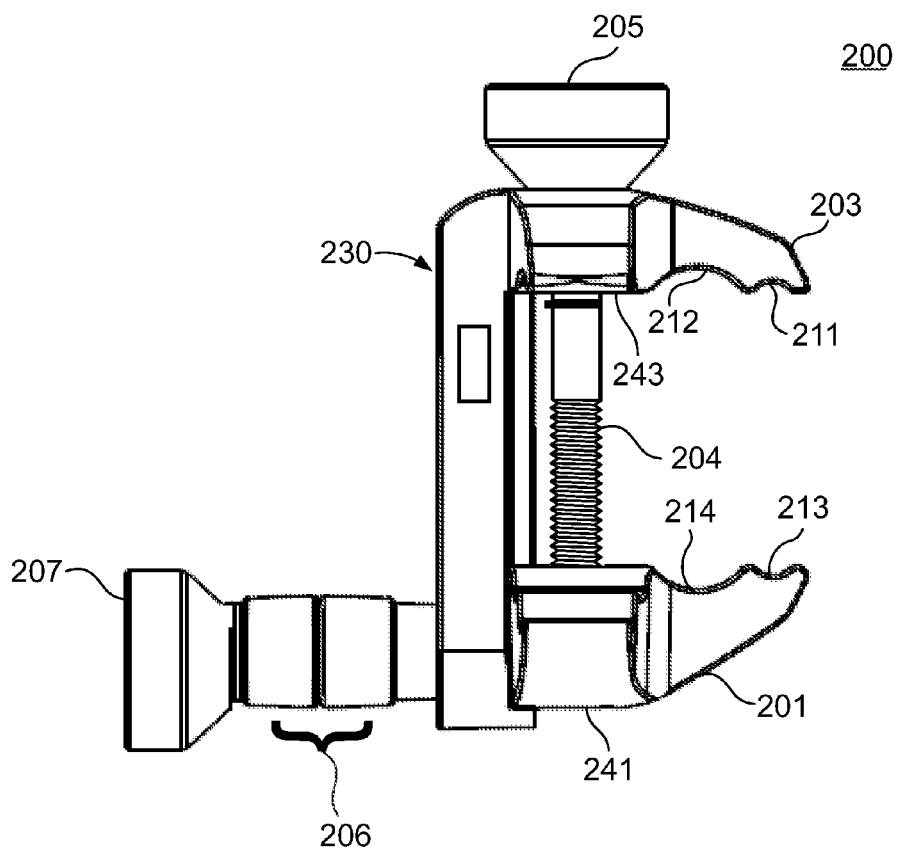
FIGS. 2A-2B show a microphone mounting apparatus according to aspects of the disclosure.
Figure 2B:
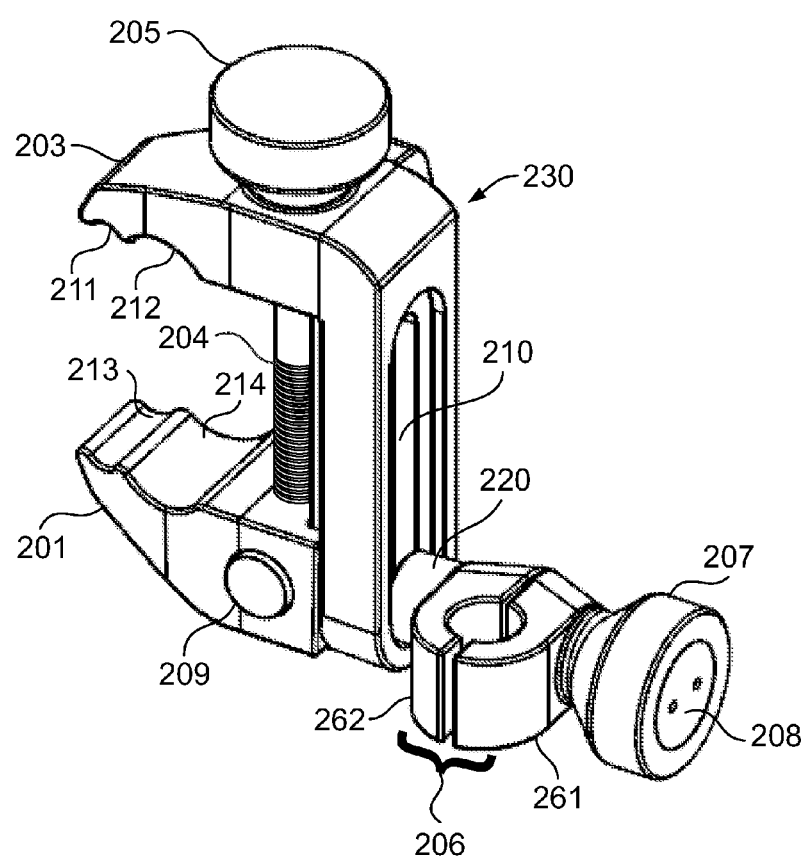

FIGS. 2A-2B show microphone mounting apparatus 200 according to aspects of the disclosure. FIG. 2A shows a front view of apparatus 200, while FIG. 2B shows an isometric view of apparatus 200. Apparatus 200 may serve as a multipurpose drum clamp, although some embodiments may be applicable to other musical instruments.

Some or all of the components of apparatus 200 may be formed by machining or casting techniques. With some embodiments, non-metallic materials may be used for some or all of the components.

Figure 7:
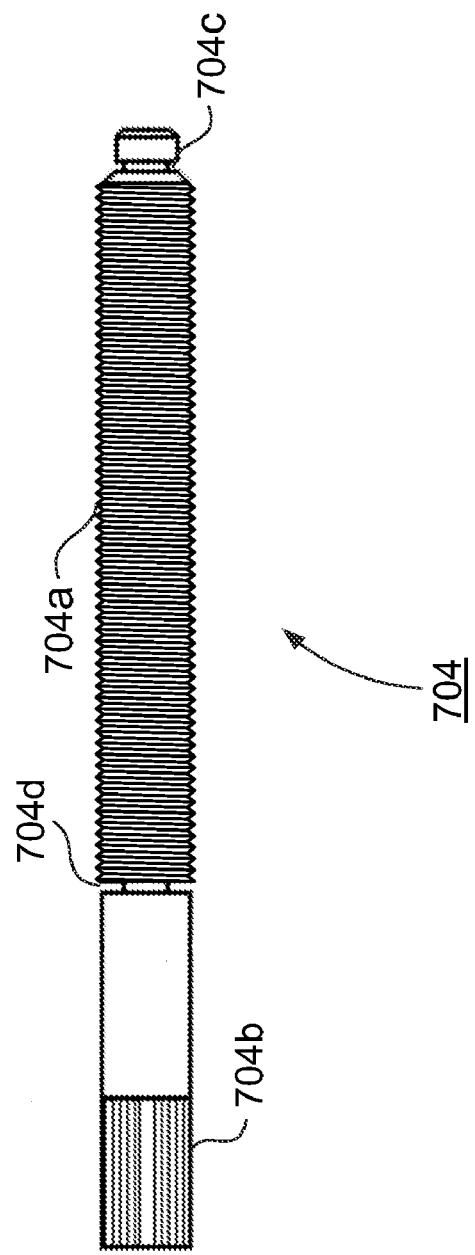
FIG. 7 shows a jaw stud of the microphone mounting apparatus in FIGS. 2A-2B according to aspects of the disclosure.

Mounting apparatus 200 may support a quick/fine clamping adjustment of lower jaw 201 and upper jaw 203. Lower jaw 201 and upper jaw 203 typically clamp to a clamping surface on or near a musical instrument to secure microphone mounting apparatus 200 so that a microphone or microphone mounting accessory (not explicitly shown) may be secured by microphone clamp 206. The quick/fine clamping adjustment permits the lower and upper jaws 201, 203 to be first adjusted to close quickly on the clamping surface, and then further tightening on the clamping surface via the fine adjustment. With some embodiments, the quick adjustment is accomplished by depressing release mechanism 209 on the lower jaw 201, which releases release mechanism 209 and allows the lower jaw 201 to move upwards to quickly close the lower and upper jaws on its intended clamping surface. Once in contact with the clamping surface, release mechanism 209 may be released, and knob 205 in conjunction with screw 204 (corresponding to jaw stud 704 as shown in FIG. 7) may be tightened to cause lower jaw 201 and/or upper jaw 203 to grip down tighter on the clamping surface. Conversely, release mechanism 209 further allows quick release of the jaws 201, 203 by depressing release mechanism 209 and separating the jaws 201,203 from one another. Once clamped to the clamping surface, a microphone or microphone mounting accessory may be mounted on to mounting apparatus 200. Consequently, the mounting apparatus 200 provides the ability to quickly clamp, tighten, and set up a microphone (e.g., on a drum kit 100 as shown in FIG. 1) as well as the ability to quickly release and remove mounting apparatus 200.

With some embodiments, apparatus 200 may support two pairs of jaws. As shown in FIGS. 2A and 2B, the first pair of jaws includes lower jaw 201 and upper jaw 203. The second pair of jaws includes lower jaw 241 and upper jaw 243 and is shown as jaws 441, 443 in FIGS. 4A and 4B. The two pairs of jaws may be oriented at approximately 90 degrees to one another; however, some embodiments may orientate the two pairs at different angles or other arrangements.

With the embodiment shown in FIG. 2, lower jaw 201 and upper jaw 203 have two curved indentations, where indentations 212 and 214 have a large radius and indentations 211 and 213 have a small radius. The various sizes of the curved indentations 211-214 provide the ability to clamp to a thicker radius bar (e.g., a microphone stand or a drum stand) via the larger radius indentations 212, 214, as well as thinner radius bar via the smaller radius indentations 211, 213. The second pair of jaws 241, 243 is typically intended for clamping to a metal drum rim. However, the drum rim may use a non-metallic material. The second pair of jaws 241, 243 may also be used to clamp the apparatus 200 to any other elongated surface (while the first pair of jaws 201, 203 is provided primarily for clamping to objects having circular cross-sections). In the embodiment shown in FIGS. 4A and 4B, the second pair of jaws 441,443 includes a plurality of notched indentations 444, 445, 446 to accommodate the surfaces of a drum rim. Specifically, top jaw 443 has only one drum rim curvature 444 while bottom jaw 441 has two drum rim curvatures 445, 446, thus providing a variety of ways to connect apparatus 200 to drum rims of various sizes and shapes.

Once apparatus 200 has been secured to a clamping surface, microphone clamp 206 may be adjusted to hold and support a microphone or a microphone mounting accessory (e.g., a microphone clip that may secure a microphone) as will be further discussed. For example, microphone clips 1600-1700 shown in FIGS. 16-17, respectively, and mounting accessories 1300-1500 shown in FIGS. 13-15, respectively, may all be secured in the microphone clamp 206 of the apparatus 200. Microphone clamp 206 comprises two clamping jaws 261, 262. In some embodiments, microphone clamp 206 may include a collar 220. Collar 220 may be a separate component through which the clamp bolt (not shown) passes, or collar 220 may be integrally formed or connected with clamping jaw 262 of the microphone clamp 206.

Microphone clamp 206 may be moved along slot 210 and rotated to position a microphone relative to a musical instrument or sound source. When microphone clamp 206 has been adjusted, microphone clamp 206 may be tightened around the microphone mounting accessory by turning clamp knob 207. With some embodiments, knob 207 is fastened to a clamp bolt (not explicitly shown in FIGS. 2 and 3, but corresponding to clamp bolt 1001 in FIG. 10) by a snap ring and covered by lid 208 (corresponding to knob lid 1201 in FIGS. 12A and 12B). The clamp bolt passes through the clamping jaws 261, 262 of the microphone clamp 206, as well as the collar 220, and is secured on the opposite side of the slot 210. Thus, loosening clamp knob 207 allows microphone clamp 206 to traverse the length of the slot 210, as well as rotate about an axis passing through the center of clamp knob 207. Specifically, collar 220 of the microphone clamp 206 slides along slot 210. Conversely, tightening clamp knob 207 causes microphone clamp 206 to be positioned and secured at a desired location along the length of the slot 210, and at a desired angle about the axis passing through the center of the clamp knob 207.

With some embodiments, jaw frame 230 includes upper jaws 203, 243 and an elongated frame body in which slot 210 is formed.

Figure 3A:
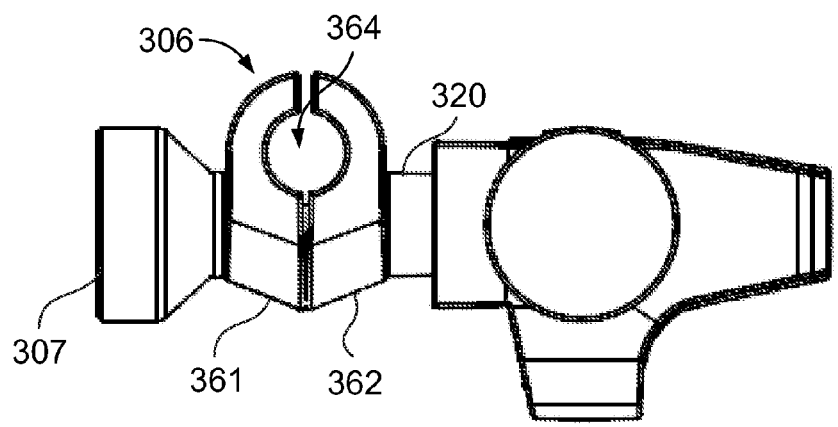
FIG. 3A-3B show top and bottom views of the microphone mounting apparatus in FIGS. 2A-2B according to aspects of the disclosure.
Figure 3B:
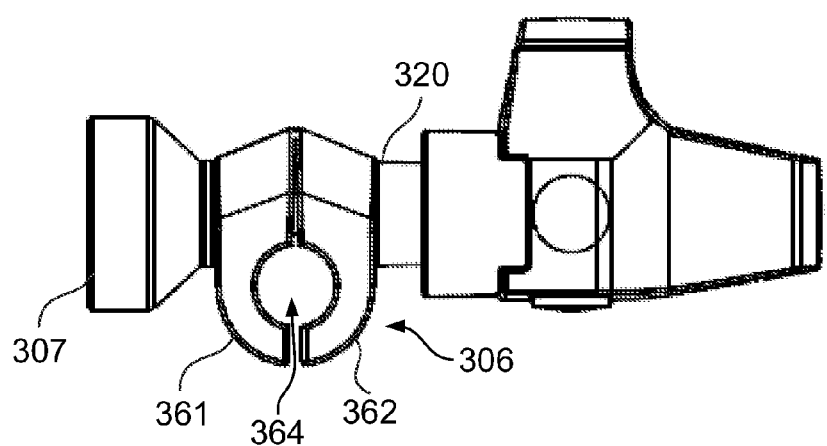
Figure 10:
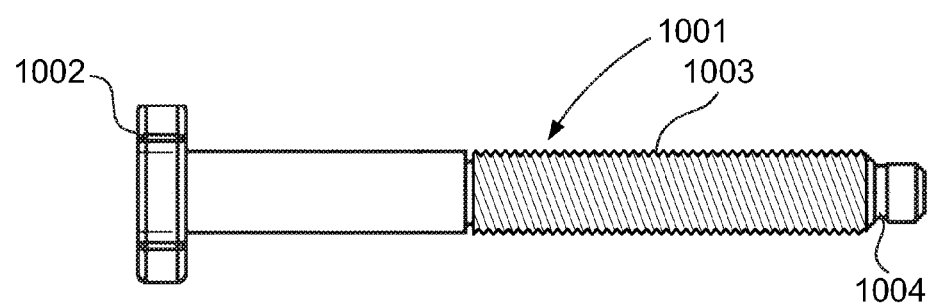
FIG. 10 shows a microphone clamp bolt of the microphone mounting apparatus in FIGS. 2A-2B according to aspects of the disclosure.

FIG. 3A-3B show top and bottom views of microphone mounting apparatus 200 in FIGS. 2A-2B according to aspects of the disclosure. With some embodiments, microphone clamp 306 includes clamping jaws 361 and 362. Once apparatus 200 has been clamped to a surface by upper jaws 203, 243 and lower jaws 201, 241 and microphone clamp 306 has been adjusted by sliding collar 320 along slot 210, a microphone accessory (e.g., a "mic clip") may be mounted into the apparatus 200 by sliding a microphone accessory in opening 364. In some embodiments, collar 320 is integral to microphone clamp 362. A clamp rod (e.g., clamp bolt 1001 as shown in FIG. 10) fits through slot 210 to secure microphone clamp 306 to jaw frame 230.

Knob 307 may be loosened and the microphone accessory may slide vertically within the slot to the desired position. Also, the clamping jaws 361, 362 may be rotated 360 degrees around the axis passing through the center of knob 307. Thus, a microphone mounting accessory held within the opening 364 of clamping jaws 361, 362 may be rotated around the axis passing through the center of knob 307. Additionally, a microphone mounting accessory held within the opening 364 may be rotated 360 degrees around the axis passing through the center of the opening 364. This configuration allows for maximum flexibility in positioning a microphone mounting accessory relative to the apparatus 200. With some embodiments, a pin (not explicitly shown) internally positioned between clamping jaw 361 and clamping jaw 362 restricts the relative rotation between the jaws 361, 362 so that the clamping jaws 361, 362 rotate together. The pin may be affixed to one of the clamping jaws 361, 362 and engage a recess (not shown) in the other of the clamping jaws 361, 362. In some embodiments, the pin and recess are positioned on corresponding inner surfaces which come into contact with one another when the microphone clamp 306 is tightened. Knob 307 may then be tightened when the desired position of the microphone mounting accessory is located. This capability may provide substantial flexibility when positioning a microphone relative to where apparatus 200 is mounted.

Figure 4A:
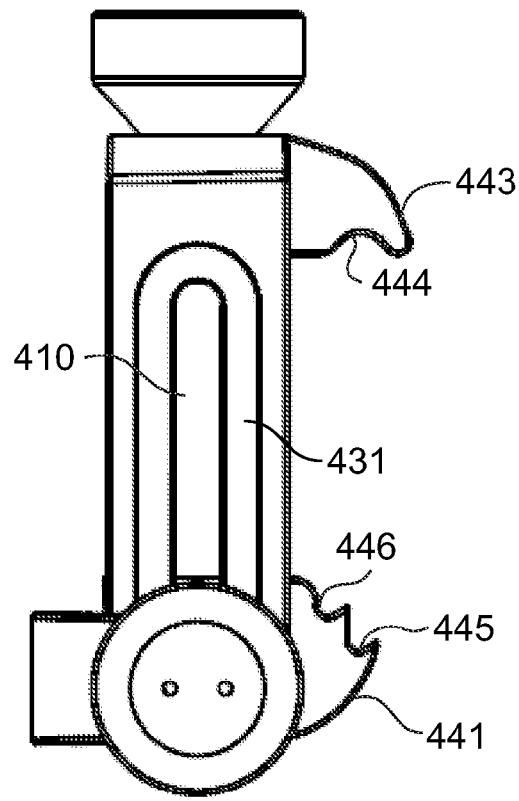
FIGS. 4A-4B show side views of the microphone mounting apparatus in FIGS. 2A-2B according to aspects of the disclosure.
Figure 4B:
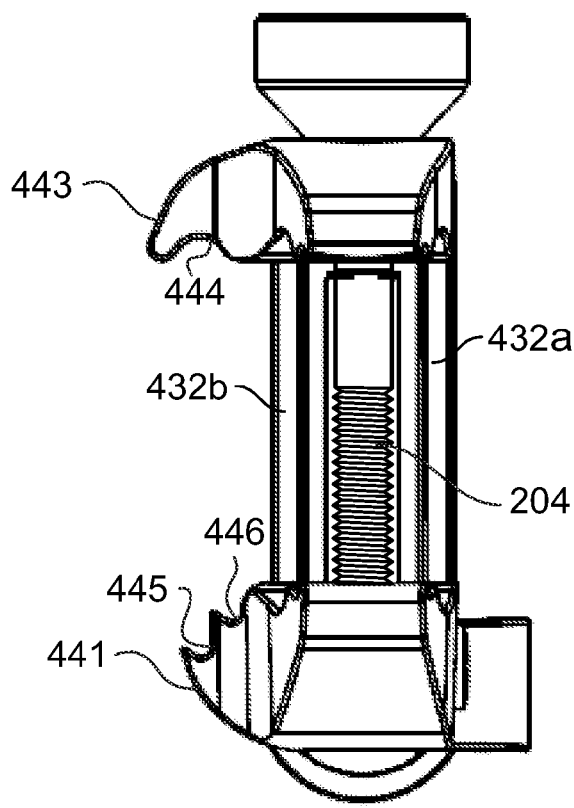

FIGS. 4A-4B show side views of microphone mounting apparatus 200 in FIGS. 2A-2B according to aspects of the disclosure. As previously discussed, apparatus 200 may include a second pair of jaws having bottom jaw 441 and top jaw 443. Also, microphone clamp 206 may be moved up or down slot 410 in order to adjust the microphone clamp.

Figure 5A:
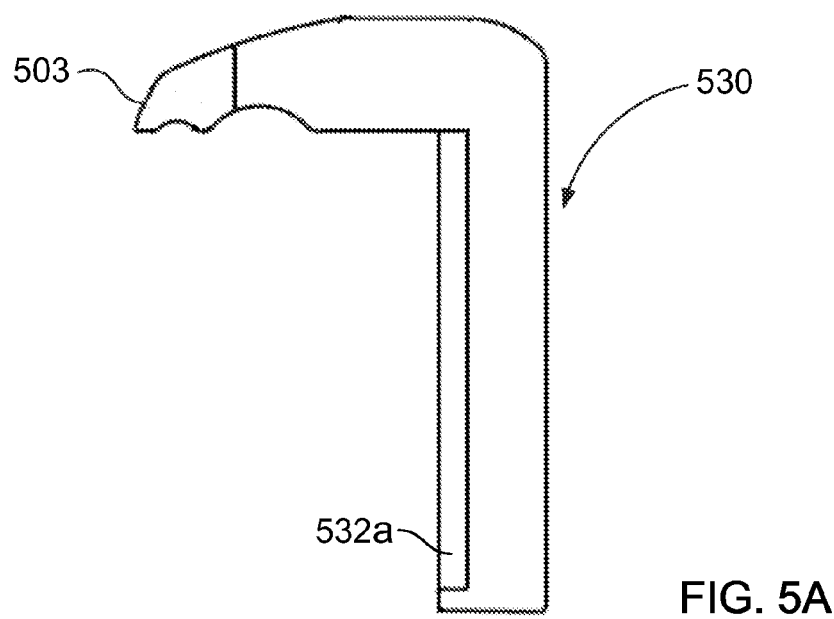
FIGS. 5A-5B show an upper jaw frame of the microphone mounting apparatus in FIGS. 2A-2B according to aspects of the disclosure.
Figure 5B:
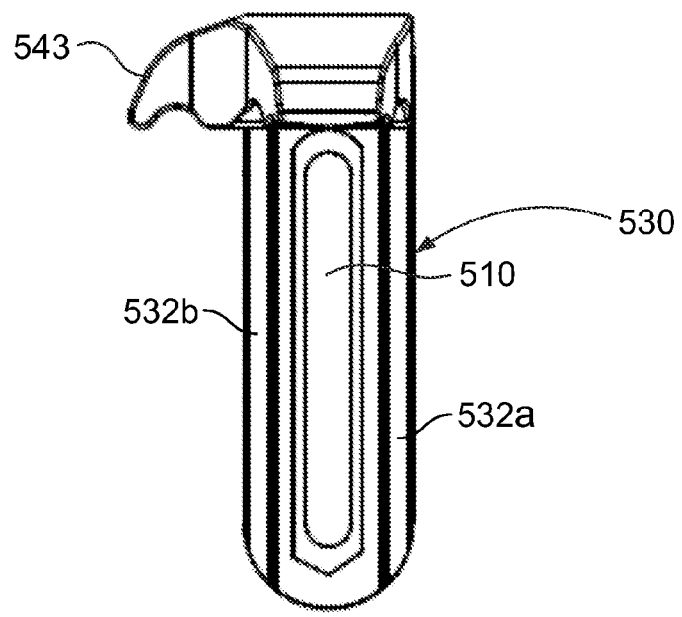

FIGS. 5A-5B show jaw frame 530 (corresponding to jaw frame 230 as shown in FIG. 2A) of microphone mounting apparatus 200 in FIGS. 2A-2B according to aspects of the disclosure. Jaw frame 530 includes upper jaws 503, 543 (corresponding to upper jaws 203, 243 as shown in FIGS. 2A and 2B). As described, the jaw frame 530 includes an elongated slot 510 passing through the body of the jaw frame 530. The slot 510 may further include a recessed portion (not explicitly shown in FIG. 5 but shown as recessed portion 431 in FIG. 4) in which the collar (corresponding to collar 220, 320 in FIGS. 2-3) slides as the microphone clamp 206 is moved along the slot 510. The jaw frame 530 further includes a pair of recessed tracks (shown as tracks 432a, 432b in FIG. 4, where track 432a corresponds to track 532a in FIG. 5) on opposite sides of the slot 510. Tracks 432a, 432b provide a surface on which the lower jaw 601 (see FIG. 6) rides as the lower jaw 601 is moved along the jaw frame 530.

Figure 6A:
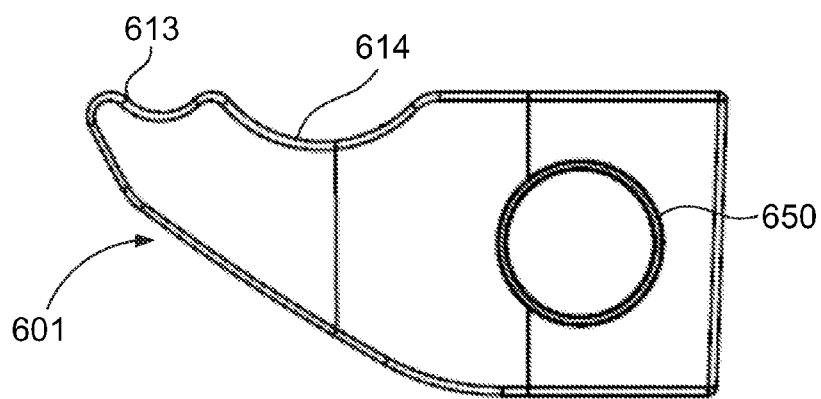
FIGS. 6A-6C show a lower jaw of the microphone mounting apparatus in FIGS. 2A-2B according to aspects of the disclosure.
Figure 6B:
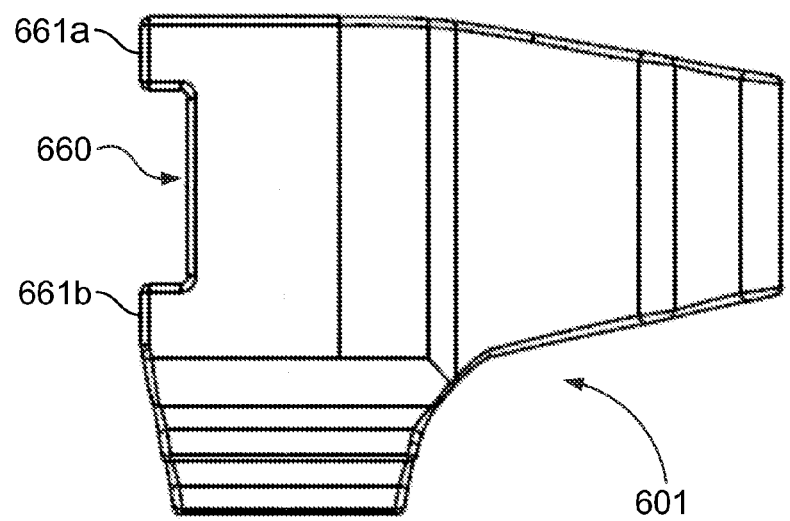
Figure 6C:
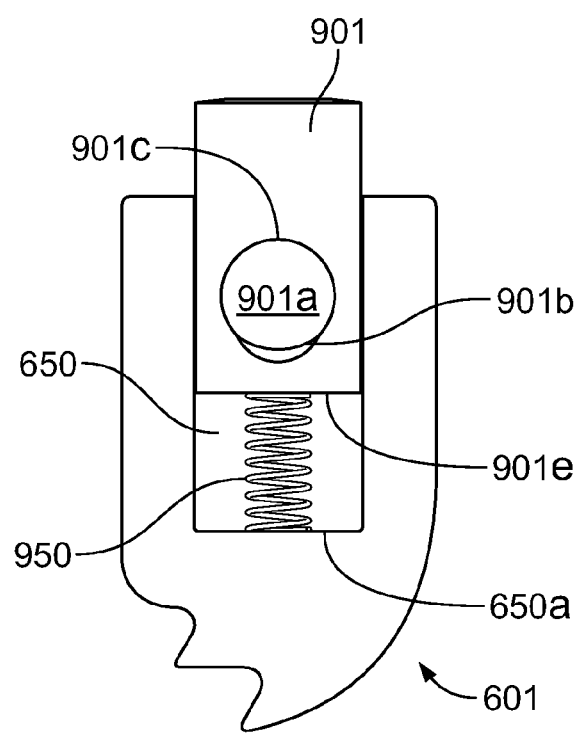

FIGS. 6A-6C show lower jaw 601 (corresponding to lower jaw 201 as shown in FIGS. 2A and 2B) of microphone mounting apparatus 200 in FIGS. 2A-2B. As previously discussed, lower jaw 601 has two curved indentations 613 and 614 (corresponding to indentations 213 and 214 as shown in FIGS. 2A and 2B) to facilitate mounting apparatus 200 to a curved or circular clamping surface.

Figure 9:
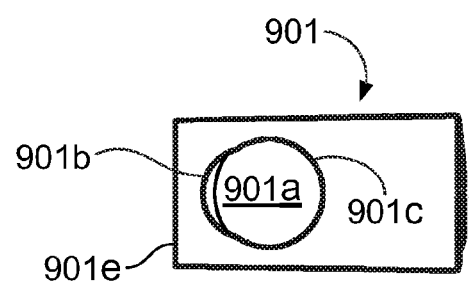
FIG. 9 shows a release dowel of the microphone mounting apparatus in FIGS. 2A-2B according to aspects of the disclosure.

Lower jaw 601 includes a cylindrical cavity 650, in which release dowel 901 (as shown in FIG. 9) is located. Cavity 650 typically has a larger diameter than release dowel 901 so that the dowel 901 can freely travel with a desired amount of play. Release dowel 901 is described in greater detail with reference to FIG. 9.

Lower jaw 601 further includes tunnel 660 and a pair of guides 661a,b that guide lower jaw 601 when traveling along jaw frame 530. Specifically, the guides 661a,b travel along the tracks 432a, 432b of the jaw frame 530 (corresponding to tracks 532a, 532b as described in FIGS. 5A-5B), while the tunnel 660 accommodates a raised up portion of the jaw frame 530 body housing the slot 510. Moreover, as seen in FIG. 6C, the cavity 650 in the lower jaw 601 accommodates the dowel 901, as described. In some embodiments, the cavity 650 may include a spring wall 650a against which an optional spring pushes to outwardly bias the dowel, as described further herein.

FIG. 7 shows jaw stud 704 (corresponding to screw 204 as shown in FIGS. 2A and 2B) of microphone mounting apparatus 200 in FIGS. 2A-2B. Jaw stud 704 is threaded along threaded portion 704a and has a splined portion 704b to which knob 205 may be securely attached. Jaw stud 704 may also include groove 704c to accommodate a retainer (e.g., a snap ring) in order to restrain lower jaw 201 from being removed from jaw stud 704. Groove 704d accommodates a retainer in order to restrain jaw stud 704 within upper jaw 203 while the jaw stud 704 is turned. Consequently, when dowel 901 is released by depressing it, the retainer prevents jaw stud 704 from being disconnected or removed from mounting apparatus 200.

Figure 8B:
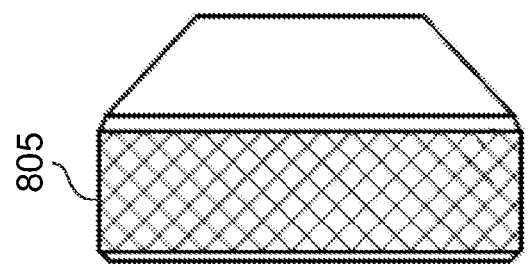
FIGS. 8A-8B show a jaw knob of the microphone mounting apparatus in FIGS. 2A-2B according to aspects of the disclosure.
Figure 8A:
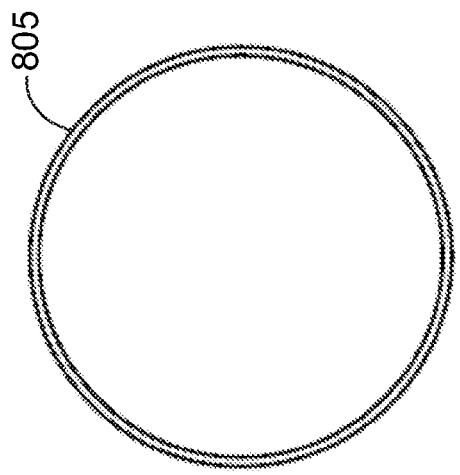

FIGS. 8A-8B show jaw knob 805 (corresponding to knob 205 as shown in FIGS. 2A and 2B) of microphone mounting apparatus 200 in FIGS. 2A-2B. As described, rotation of jaw knob 805 imparts rotation on jaw stud 704 causing the lower jaw 201 to move relative to upper jaw 203 to either tighten or loosen the jaws 201, 203 with respect to a clamping surface.

FIG. 9 shows release dowel 901 of microphone mounting apparatus 200 in FIGS. 2A-2B. As previously described, release dowel 901 fits within cavity 650 as shown in FIG. 6C. In an embodiment, the dowel 901 may include a spring surface 901e which abuts a spring 950 positioned within the cavity 650, as described later herein.

A hole 901a is formed through a lateral direction of release dowel 901. The hole 901a includes a threaded curved surface 901b and smooth (unthreaded) curved surface 901c. Release dowel 901 is situated into cavity 604 so that jaw stud 704 fits within the hole 901a. When jaw stud 704 is within threaded curved surface 901b, threaded portion 704a meshes with the threads of threaded curved surface 901b. Thus, when jaw stud 704 is turned by knob 805, jaw stud 704 travels along the threads to either tighten or loosen jaws 201 and 203 depending on the direction that jaw stud 704 turns. However, when jaw stud 704 abuts or is proximate to smooth curved surface 901c (and free from threaded curved surface 901b), jaw stud 704 is free to move up or down without jaw stud 704 turning due to a lack of engagement between the threads on the jaw stud 704 and the threads on the threaded curved surface 901b. Consequently, jaws 201 and 203 may be quickly adjusted relative to one another, making it easier to quickly clamp the jaws 201, 203 onto a surface, or release the jaws 201, 203 therefrom.

With some embodiments, a spring 950 is positioned between release dowel 901 and the cavity 650 (as shown in FIG. 6C). Specifically, the spring 950 may be positioned between the spring wall 650a of the cavity 650 and the spring surface 901e of the dowel 901, so that the spring 950 exerts pressure against the dowel 901. In this way, the spring 950 outwardly biases the dowel 901 relative to the cavity 650. The outward biasing force of the spring 950 causes threaded curved surface 901b to engage the threaded portion 704a of the jaw stud 704 when dowel 901 is not depressed. However, when dowel 901 is depressed inwardly (against the force of the spring 950 and into the cavity 650), the threaded portion 704a of jaw stud 704 disengages the threaded curved surface 901b. As the jaw stud 704 is free from the threaded curved surface 901b, and located proximate the smooth curved surface 901c, the lower jaw 201 is free to slide along the jaw stud 704, thus making quick adjustment of the jaws 201, 203 possible.

While the exemplary embodiment shown in FIG. 9 utilizes dowel 901 as a release mechanism, some embodiments may use a different release mechanism. For example, mounting apparatus 200 may utilize a linear ratcheting mechanism in which a pawl (in one example, located within the lower jaw) travels along teeth formed on or within the jaw frame 530. In such an embodiment, the pawl and ratcheting mechanism may be used for quick adjustment while the jaw stud may continue to function as described herein for purposes of fine adjustment of the jaws. In one embodiment of such a ratcheting mechanism, the pawl may engage one or more of the described teeth. However, when an appropriate ratchet release mechanism is depressed, the pawl may disengage the teeth such that the lower jaw can move along the jaw stud without the jaw stud turning.

FIG. 10 shows microphone clamp bolt 1001 of microphone mounting apparatus 200 in FIGS. 2A-2B. As discussed previously, clamp bolt 1001 as shown in FIG. 10 passes through both clamp jaws 261, 262 of the microphone clamp 206, through the collar 220, and through the slot 510 to secure microphone clamp 206 to jaw frame 230. In an embodiment, clamp bolt 1001 has bolt head 1002 that fits into slot 510 on the inside of jaw frame 230, and specifically rides along the recessed portion 531 of the slot 210. Clamp bolt 1001 is threaded along threaded portion 1003 so that clamp knob 207 may be tightened so as to close the jaws 201, 202 of microphone clamp 206. Groove 1004 is located at the end opposite to bolt head 1002 to secure a retainer (e.g., a snap ring) to prevent clamp knob 207 from being removed from clamp bolt 1001 when clamp knob 207 is turned to move it away from bolt head 1002.

Figure 11A:
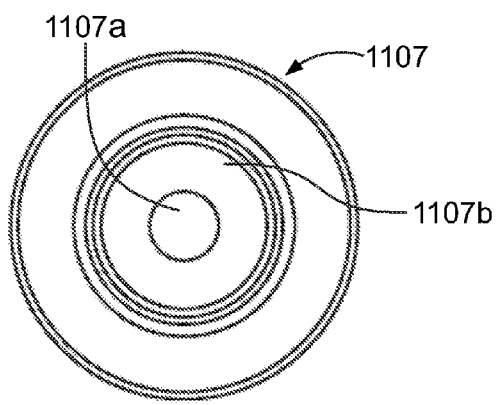
FIGS. 11A-11B show a clamp knob of the microphone mounting apparatus in FIGS. 2A-2B according to aspects of the disclosure.
Figure 11B:
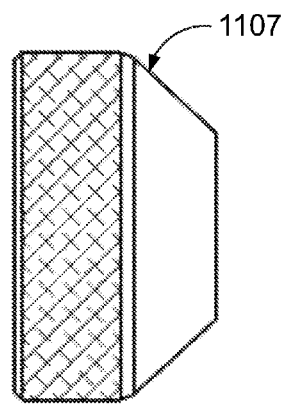
Figure 12A:
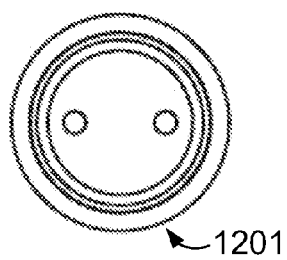
FIGS. 12A-12B show a knob lid for the knob in FIGS. 11A-11B according to aspects of the disclosure.
Figure 12B:
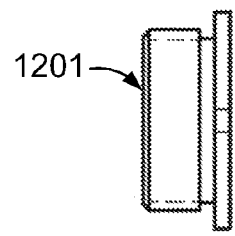

FIGS. 11A-11B show clamp knob 1107 of microphone mounting apparatus 200 in FIGS. 2A-2B according to aspects of the disclosure (wherein clamp knob 1107 in FIGS. 11A-11B corresponds with clamp knob 207 in FIGS. 2A-2B and clamp knob 307 in FIGS. 3A-3B). With some embodiments, hole 1107a is threaded to engage with the threaded portion 1003 of microphone clamp bolt 1001 in order to tighten microphone clamp 206. Also, threaded recess 1107b may accommodate knob lid 1201 (as shown in FIGS. 12A and 12B) so that the end of the clamp bolt 1001 may be covered to conceal it.

A variety of microphone mounting accessories may be employed with the microphone apparatus 200, and inserted into and supported by the microphone clamp 206 of the apparatus 200. Such mounting accessories may include microphone clip supports (e.g., FIG. 13), gooseneck microphone supports (e.g., FIG. 14), threaded microphone clip adapters (e.g., FIG. 15), and a variety of different sized microphone clips (e.g., FIGS. 16-17).

Figure 13:
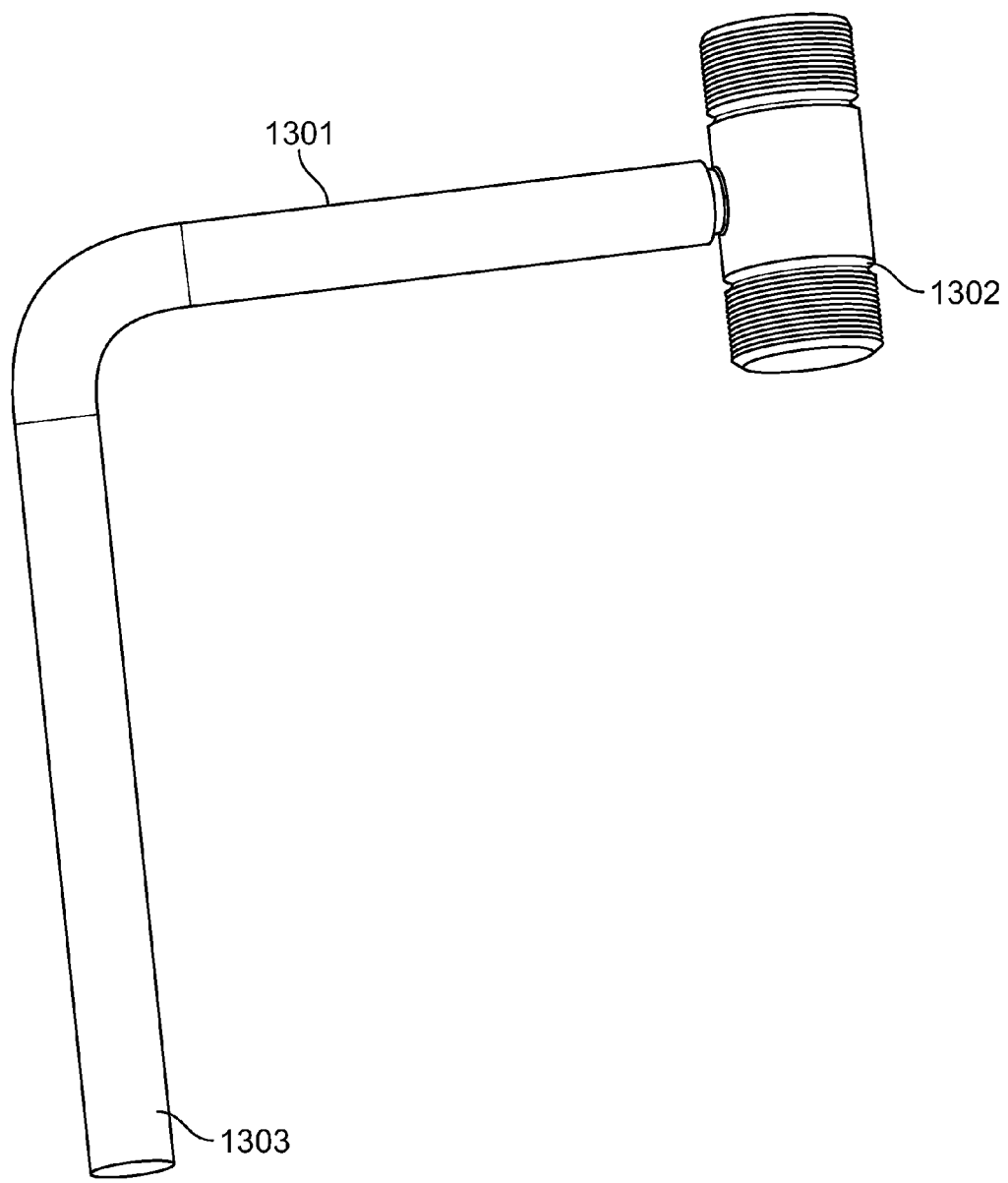
FIG. 13 shows a microphone mounting accessory that may be secured by the clamp of the microphone mounting in FIGS. 2A-2B according to aspects of the disclosure.

FIG. 13 shows a microphone mounting accessory which is a microphone clip support 1300. A free end 1303 of microphone clip support 1300 may be secured by microphone clamp 206 of the microphone mounting apparatus 200 (as described with reference to FIGS. 2A-2B) In an embodiment, microphone clip support 1300 generally has an "L" shaped configuration formed by upper portion 1301 and lower portion 1303, which fits into microphone clamp 206. End portion 1302 extends from upper portion 1301. End portion 1302 includes two opposing male threaded ends which may accommodate a standard microphone clip (not shown) having female mating threads. For example, a Shure® Model A25D microphone clip having a ⅝-inch diameter female threaded portion (with 27 threads per inch) may be screwed onto one of the threaded ends of end portion 1302. One embodiment of such a microphone clip support 1300 is Shure® Part No. 90A4646 L-Adapter Extension for Model A56D Microphone Drum Mount.

Figure 14:
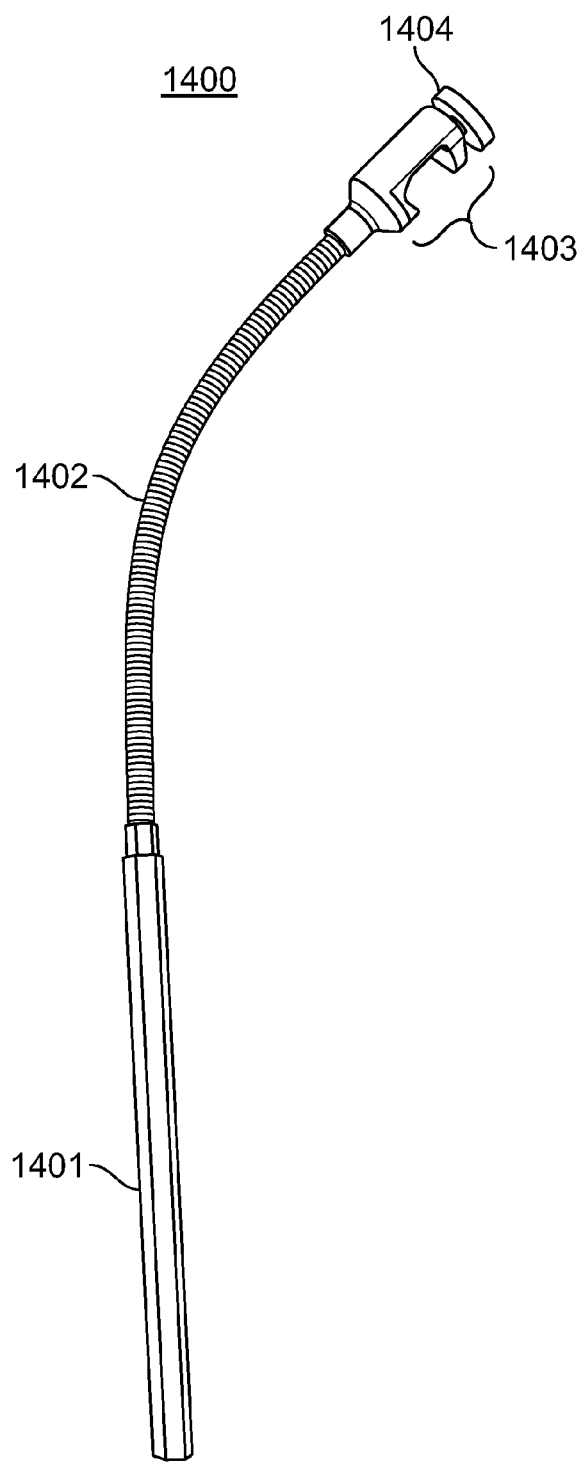
FIG. 14 shows another microphone mounting accessory that may be secured by the clamp of the microphone mounting in FIGS. 2A-2B according to aspects of the disclosure.

FIG. 14 shows a microphone mounting accessory which is a gooseneck microphone support 1400. Gooseneck microphone support 1400 includes a rigid portion at free end 1401 that may be secured by microphone clamp 206 of the microphone mounting apparatus 200 in FIGS. 2A-2B. Gooseneck microphone support 1400 further includes a flexible portion 1402 connected to a mounting section 1403 which secures a microphone (not shown) by tightening set screw 1404 against the microphone body. For example, a Shure® Model Beta 98/S Instrument Microphone may be mounted in the mounting section 1403 of the gooseneck microphone support 1400. One embodiment of such a gooseneck microphone support 1400 is the gooseneck adapter for the Shure® Model A98D Microphone Drum Mount. Flexible portion 1402 enables a user to adjust the positioning of the microphone in the mounting section 1403 by bending flexible section 1402 as desirable.

Figure 15:
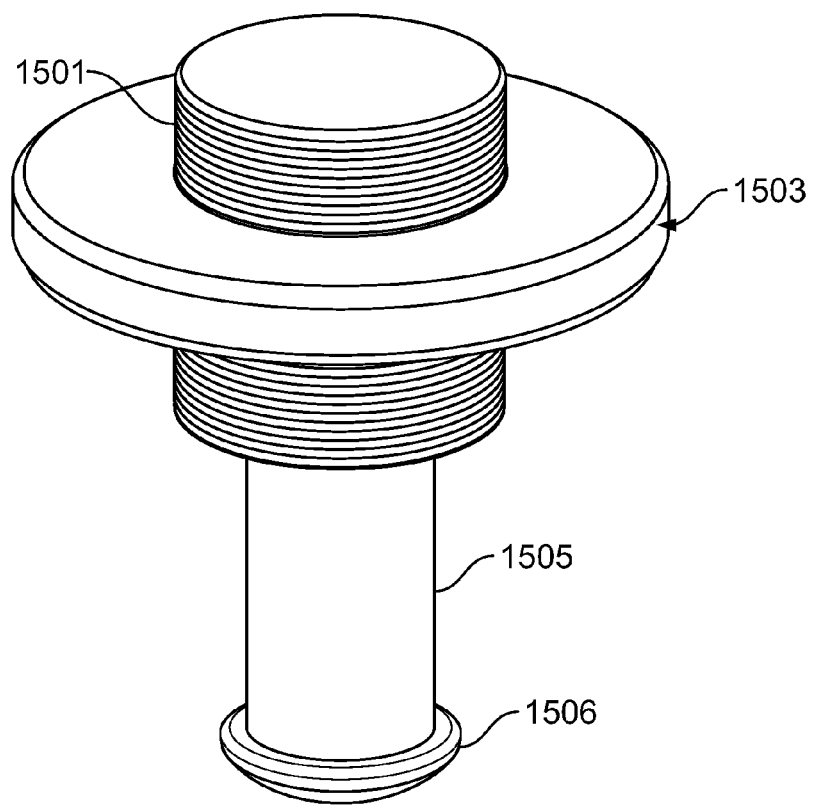
FIG. 15 shows yet another microphone mounting accessory that may be secured by the clamp of the microphone mounting in FIGS. 2A-2B according to aspects of the disclosure.

FIG. 15 shows a microphone mounting accessory which is a threaded microphone clip adapter 1500 that may be secured by microphone clamp 206 of the microphone mounting apparatus 200 in FIGS. 2A-2B. Threaded microphone clip adapter 1500 includes a threaded stud 1501, locking ring 1503, and a mounting stem 1505. In an embodiment, threaded stud 1501 may be threaded along its entire length, or on any relevant portion thereof. Locking ring 1503 may be threaded so as to mate with the threads on the threaded stud 1501, thereby allowing the locking ring 1503 to move along the length of the threaded stud 1501. As with the other microphone mounting accessories, the threaded stud 1501 may be configured to receive a standard microphone clip (not shown) having female mating threads. For example, a Shure® Model A25D microphone clip having a ⅝-inch diameter female threaded portion (with 27 threads per inch) may be screwed onto the threaded stud 1501. Once the microphone clip is attached, the locking ring 1503 may be backed up and tightened against the bottom of the microphone clip, thereby causing a friction fit between the microphone clip and locking ring 1503 and preventing the microphone clip from loosening or rotating about the threaded stud 1501. The mounting stem 1505 is inserted into the microphone clamp 206 of the microphone apparatus 200, and tightened therein. Moreover, the mounting stem 1505 includes an enlarged end portion 1506. The enlarged end portion 1506 has a diameter greater than that of the mounting stem 1505, so as to prevent the threaded microphone clip adapter 1500 from disengaging from the clamp jaws 261, 262 of the microphone clamp 206.

Figure 16:
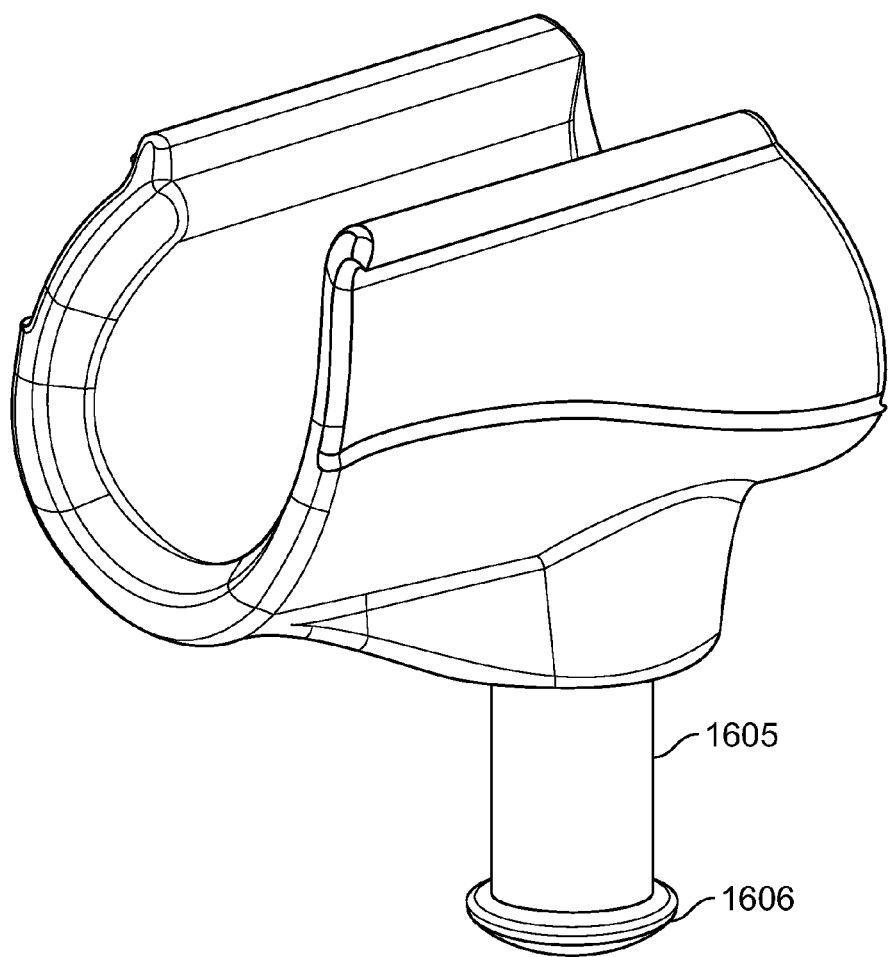
FIG. 16 shows yet another microphone mounting accessory that may be secured by the clamp of the microphone mounting in FIGS. 2A-2B according to aspects of the disclosure.

FIG. 16 shows a microphone mounting accessory which is a small microphone clip 1600 that may be secured by microphone clamp 206 of the microphone mounting apparatus 200 in FIGS. 2A-2B. Small microphone clip 1600 includes a mounting stem 1605. The mounting stem 1605 is inserted into the microphone clamp 206 of the microphone apparatus 200, and tightened therein. Moreover, the mounting stem 1605 includes an enlarged end portion 1606. The enlarged end portion 1606 has a diameter greater than that of the mounting stem 1605, so as to prevent the threaded microphone clip adapter 1600 from disengaging from the clamp jaws 261, 262 of the microphone clamp 206. Small microphone clip 1600 is typically used for securing microphones having smaller diameters (e.g., for condenser drum microphones). For example, Shure® Model PG81 Instrument Microphone may be secured by small microphone clip 1600.

Figure 17:
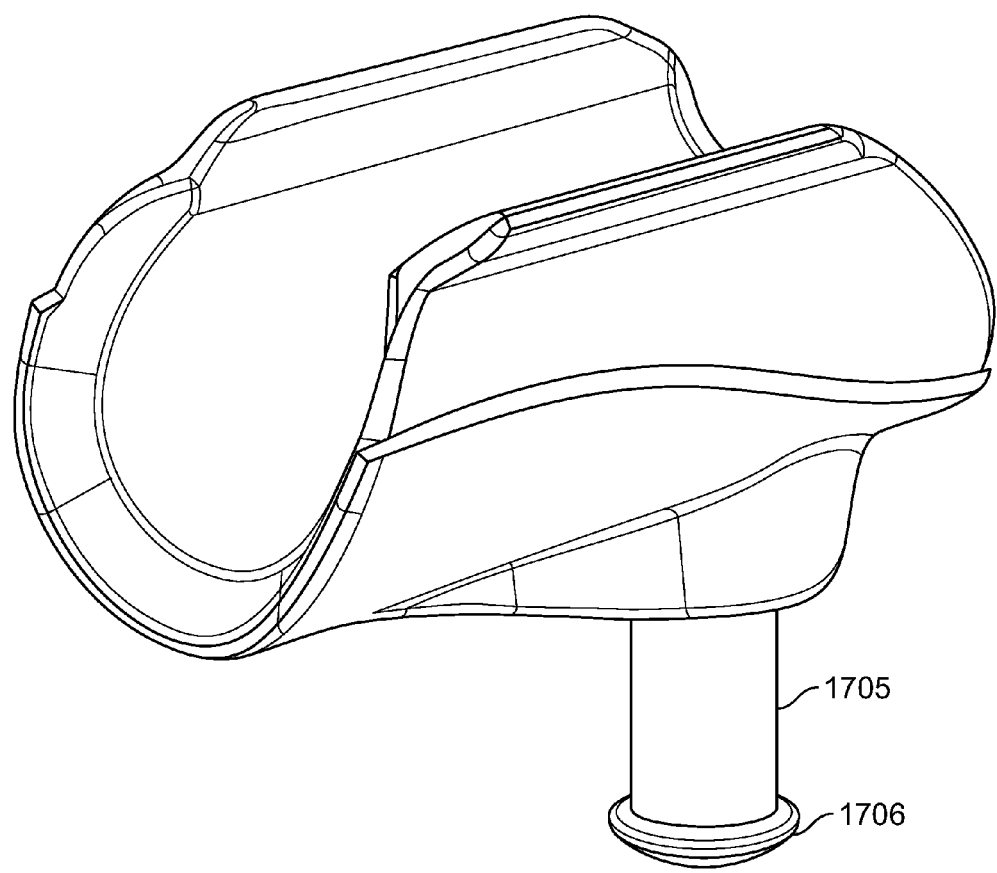
FIG. 17 shows yet another microphone mounting accessory that may be secured by the clamp of the microphone mounting in FIGS. 2A-2B according to aspects of the disclosure.

FIG. 17 shows a microphone mounting accessory which is a large microphone clip 1700 that may be secured by microphone clamp 206 of the microphone mounting apparatus 200 in FIGS. 2A-2B. Large microphone clip 1700 includes a mounting stem 1705. The mounting stem 1705 is inserted into the microphone clamp 206 of the microphone apparatus 200, and tightened therein. Moreover, the mounting stem 1705 includes an enlarged end portion 1706. The enlarged end portion 1706 has a diameter greater than that of the mounting stem 1705, so as to prevent the threaded microphone clip adapter 1700 from disengaging from the clamp jaws 261, 262 of the microphone clamp 206. Large microphone clip 1700 is typically used for securing microphones having larger diameters (e.g., dynamic instrument microphones). For example, Shure® Model SM57 Instrument Microphone may be secured by large microphone clip 1700. With both small and large microphone clips 1600, 1700, the mounting stems 1605, 1705 may be attached to the clip body, or may be formed integrally therewith.

It will be understood by those skilled in the art that a large variety of microphone mounting accessories may be employed with the microphone mounting apparatus 200 described herein. For example, any accessory including a mounting stem (similar to mounting stems 1505, 1605, and 1705 described herein with reference to FIGS. 15-17) may be supported by the microphone mounting apparatus 200 by inserting the mounting stem into the microphone clamp 206 thereof, and tightening the clamping jaws 261, 262 via the clamp knob 207. Furthermore, although certain exemplary dimensions and thread pitches are described herein, it should be understood that such dimensions and thread pitches are merely examples and that any appropriate sizes and configuration may be employed.

While the invention has been described with respect to specific examples including present modes of carrying out the invention, those skilled in the art will appreciate that there may be numerous variations and permutations of the above described systems and techniques that fall within the spirit and scope of the exemplary embodiments of the invention as set forth in the appended claims.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus for mounting a microphone in proximity of a sound source, comprising:
    a first pair of jaws configured to attach to a clamping surface proximate the sound source;
    a jaw stud connecting the first pair of jaws, the jaw stud having a threaded portion;
    a release mechanism coupled to the jaw stud, wherein while the release mechanism is depressed, a first jaw of the first pair is free to slide along the jaw stud to open or close the first pair of jaws, wherein while the release mechanism is not depressed, the release mechanism engages the threaded portion of the jaw stud, thereby allowing the first pair of jaws to tighten on the clamping surface when the jaw stud is turned along the threaded portion in a first direction;
    a microphone clamp configured to hold a microphone mounting accessory associated with the microphone;
    a jaw frame comprising a second jaw of the first pair of jaws, the jaw frame having an elongated slot therein; and
    a clamp bolt passing through the slot and the microphone clamp to secure the microphone clamp to the jaw frame.

2. The apparatus of claim 1, wherein the clamp bolt and microphone clamp are positionable along the slot.

3. The apparatus of claim 1, wherein the slot is oriented parallel to the length of the jaw stud.

4. The apparatus of claim 2, wherein the microphone clamp comprises:
    a pair of clamp jaws, each clamp jaw having a hole, the clamp bolt passing through each hole to secure the microphone clamp to the jaw frame, the pair of jaw clamps being rotatable around the clamp bolt.

5. The apparatus of claim 4, further comprising:
    a pin coupled between the pair of clamp jaws restricting the pair of clamps to rotate together about the clamp bolt.

6. The apparatus of claim 4, the clamp bolt having a bolt head that fits on an inside surface of the slot, the bolt head being moveable along the slot to adjust a position of the microphone clamp within the slot.

7. The apparatus of claim 6, further comprising:
    a clamp knob coupled to the clamp bolt such that when the clamp knob is turned in one direction, the microphone clamp tightens around the microphone mounting accessory.

8. The apparatus of claim 1, wherein the microphone clamp further comprises:
    a collar abutting an outside surface of the slot, the clamp bolt passing through the collar.

9. The apparatus of claim 8, wherein the slot comprises a recessed portion, wherein the collar is positioned at least partially within the recessed portion of the slot when the microphone clamp is tightened on the microphone mounting accessory.

10. An apparatus for mounting a microphone in proximity of a musical instrument, comprising:
    a first jaw of a pair of jaws;
    a jaw frame comprising a second jaw of the pair of jaws, the jaw frame having an elongated slot therein;
    the pair of jaws configured to attach to a clamping surface associated with the musical instrument;
    a jaw stud connecting the pair of jaws, the jaw stud having a threaded portion;
    a release mechanism coupled to the jaw stud, wherein while the release mechanism is depressed, the first jaw is free to slide along the jaw stud to move towards or away from the second jaw, wherein while the release mechanism is not depressed, the release mechanism engages the threaded portion of the jaw stud, thereby allowing the first pair of jaws to tighten on the clamping surface when the threaded portion of the jaw stud is turned in a first direction; and
    a microphone clamp configured to hold a microphone mounting accessory associated with the microphone, the microphone clamp comprising:
        a clamp bolt passing through the slot to secure the microphone clamp to the jaw frame;
        a pair of clamp jaws, each clamp jaw having a hole, the clamp bolt passing through each hole to secure the microphone clamp to the jaw frame, the pair of jaw clamps being rotatable around the clamp bolt; and
        a clamp knob connected to the clamp bolt, the microphone clamp tightening around the microphone mounting accessory when the clamp knob is turned in one direction.

11. The apparatus of claim 10, the release mechanism comprising:
    a dowel release having a hole through which the jaw stud passes, the hole having a first curved surface and a second curved surface, the second curved surface being threaded to engage the threaded portion of the jaw stud, the first curved surface being smooth so as to permit the dowel release to move along the jaw stud, wherein when the dowel release is depressed the jaw stud is located proximate the first curved surface and when the dowel release is not depressed the threaded portion of the jaw stud engages the second curved surface.

12. The apparatus of claim 10, wherein the slot comprises a recessed portion, wherein the microphone clamp further comprises a collar through which the clamp bolt passes, wherein at least a portion of the collar is positioned within the recessed portion of the slot when the microphone clamp is tightened on the microphone mounting accessory.

13. The apparatus of claim 10, wherein the clamp bolt is slideable along the length of the slot so as to permit the microphone clamp to be positioned in a variety of locations along the slot and relative to the jaw frame.

14. An apparatus for mounting a microphone in proximity of a plurality of sound sources, comprising:
    a first pair of jaws and a second pair of jaws, the first pair of jaws comprising a first jaw and a second jaw, the second pair of jaws comprising a third jaw and a fourth jaw, the third jaw connected to the first jaw, the fourth jaw connected to the second jaw, the first jaw having a cylindrical cavity;
    a jaw frame connected to the second jaw, the jaw frame having an elongated slot therein;
    the first pair of jaws configured to attach to a first clamping surface associated with a first sound source;
    the second pair of jaws configured to attach to a second clamping surface of a second sound source;
    a jaw stud connecting the first pair of jaws, the jaw stud having a threaded portion;
    a dowel release positioned within the cylindrical cavity, the dowel release having a hole through which the jaw stud passes;
    a spring positioned within the cylindrical cavity and in contact with the dowel release so as to outwardly bias the dowel release from the cylindrical cavity, wherein when the dowel release is moveable from a first depressed position in which the dowel release does not engage the threaded portion and is slideable along the length of the jaw stud, and a second released position in which the dowel release engages the threaded portion and is moveable along the length of the jaw stud only by turning the jaw stud about is lengthwise axis; and a microphone clamp configured to hold a microphone mounting accessory associated with the microphone, the microphone clamp comprising:

a clamp bolt passing through the slot to secure the microphone clamp to the jaw frame;

a pair of clamp jaws, each clamp jaw having a hole, the clamp bolt passing through each hole to secure the microphone clamp to the jaw frame, the pair of jaw clamps being rotatable around the clamp bolt; and a clamp knob connected to the clamp bolt, the microphone clamp tightening around the microphone mounting accessory when the clamp knob is turned in one direction.

15. The apparatus of claim 14, wherein one of the first or second pair of jaws comprises a plurality of curved indentations, wherein the first clamping surface comprises a microphone or drum stand member having a generally circular cross section, wherein the member is positionable within the plurality of curved indentations.

16. The apparatus of claim 15, wherein the other of the first or second pair of jaws comprises a plurality of notched indentations, wherein the second clamping surface comprises a drum rim having a generally elongated cross section, wherein the drum rim is positionable within the plurality of notched indentations.

* * * * *